United States Patent
Bae et al.

(10) Patent No.: US 11,282,684 B2
(45) Date of Patent: Mar. 22, 2022

(54) METHOD FOR PRODUCING TEST PIECES OF WATER-INSOLUBLE MATERIAL FOR MALDI MASS SPECTROMETRY AND METHOD FOR QUANTITATIVE ANALYSIS OF WATER-INSOLUBLE MATERIAL USING MALDI MASS SPECTROMETRY

(71) Applicant: LG Chem, Ltd., Seoul (KR)

(72) Inventors: Yongjin Bae, Daejeon (KR); Young Hee Lim, Daejeon (KR); Yeu Young Youn, Daejeon (KR); Joo Eun Jung, Daejeon (KR); Byung Hyun Park, Daejeon (KR); Hyun Sik You, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/954,773

(22) PCT Filed: Sep. 11, 2019

(86) PCT No.: PCT/KR2019/011775
§ 371 (c)(1),
(2) Date: Jun. 17, 2020

(87) PCT Pub. No.: WO2020/055131
PCT Pub. Date: Mar. 19, 2020

(65) Prior Publication Data
US 2021/0090866 A1     Mar. 25, 2021

(30) Foreign Application Priority Data

Sep. 11, 2018   (KR) .................. 10-2018-0108097
Sep. 10, 2019   (KR) .................. 10-2019-0112140

(51) Int. Cl.
*H01J 49/00*        (2006.01)
*H01J 49/16*        (2006.01)
(Continued)

(52) U.S. Cl.
CPC ............ *H01J 49/0009* (2013.01); *B01F 3/00* (2013.01); *B01F 3/186* (2013.01); *G01N 1/286* (2013.01);
(Continued)

(58) Field of Classification Search
None
See application file for complete search history.

(56) References Cited

U.S. PATENT DOCUMENTS 5,675,410 A * 10/1997 Kanda .................... G01N 1/286
                                                         356/244
9,646,812 B2 * 5/2017 Schmitz .............. H01J 49/0418
(Continued)

FOREIGN PATENT DOCUMENTS

JP        200282027 A      3/2002
JP        200652963 A      2/2006
(Continued)

OTHER PUBLICATIONS

International Search Report for Application No. PCT/KR2019/011775 dated Jan. 17, 2020, 2 pages.
(Continued)

*Primary Examiner* — Michael J Logie
(74) *Attorney, Agent, or Firm* — Lerner, David, Littenberg, Krumholz & Mentlik, LLP

(57) ABSTRACT

The present invention relates to a method for producing test pieces in which the thickness of the samples of homogeneous water-insoluble material is uniform, and to a method for quantitative analysis of water-insoluble material by analyzing such test pieces using MALDI mass spectrometry. Specifically, the test pieces can be produced by: adding a volatile solvent to a mixture of water-insoluble material and matrix; placing, in a pellet cup made of water-soluble material, and pressing, with even pressure, the sample
(Continued)

obtained by mixing the mixture of water-insoluble material and matrix until the solvent has evaporated; and melting the pellet cup with water.

10 Claims, 4 Drawing Sheets

(51) Int. Cl.
*H01J 49/04* (2006.01)
*G01N 1/28* (2006.01)
*B01F 3/18* (2006.01)
*G01N 1/38* (2006.01)
*B01F 3/00* (2006.01)

(52) U.S. Cl.
CPC ............ *G01N 1/38* (2013.01); *H01J 49/0418* (2013.01); *H01J 49/164* (2013.01); *G01N 2001/2893* (2013.01)

(56) References Cited

U.S. PATENT DOCUMENTS

| | | | |
|---|---|---|---|
| 10,074,530 B1* | 9/2018 | Schlaf | H01J 49/0418 |
| 2004/0245456 A1 | 12/2004 | Heo | |
| 2010/0108887 A1* | 5/2010 | Ogawa | G01N 21/3563 250/339.08 |
| 2010/0243901 A1* | 9/2010 | Okamoto | B29C 43/003 250/339.07 |
| 2015/0162176 A1 | 6/2015 | Schmitz et al. | |
| 2015/0221488 A1 | 8/2015 | Hyeon et al. | |
| 2021/0175061 A1* | 6/2021 | Bae | H01J 49/0418 |

FOREIGN PATENT DOCUMENTS

| | | |
|---|---|---|
| JP | 200678386 A | 3/2006 |
| JP | 2007309860 A | 11/2007 |
| JP | 201232279 A | 2/2012 |
| JP | 2012177689 A | 9/2012 |
| JP | 2013186146 A | 9/2013 |
| JP | 5422089 B2 | 2/2014 |
| JP | 2015028474 A | 2/2015 |
| JP | 2015155884 A | 8/2015 |
| JP | 2015528116 A | 9/2015 |
| JP | 2017173277 A | 9/2017 |
| KR | 20040105360 A | 12/2004 |
| KR | 20170021398 A | 2/2017 |
| KR | 20170102685 A | 9/2017 |

OTHER PUBLICATIONS

Skelton, et al., "A MALDI Sample Preparation Method Suitable for Insoluble Polymers," Anal. Chem., Apr. 1, 2000, pp. 1707-1710, vol. 72, No. 7.

* cited by examiner

[Fig. 1]
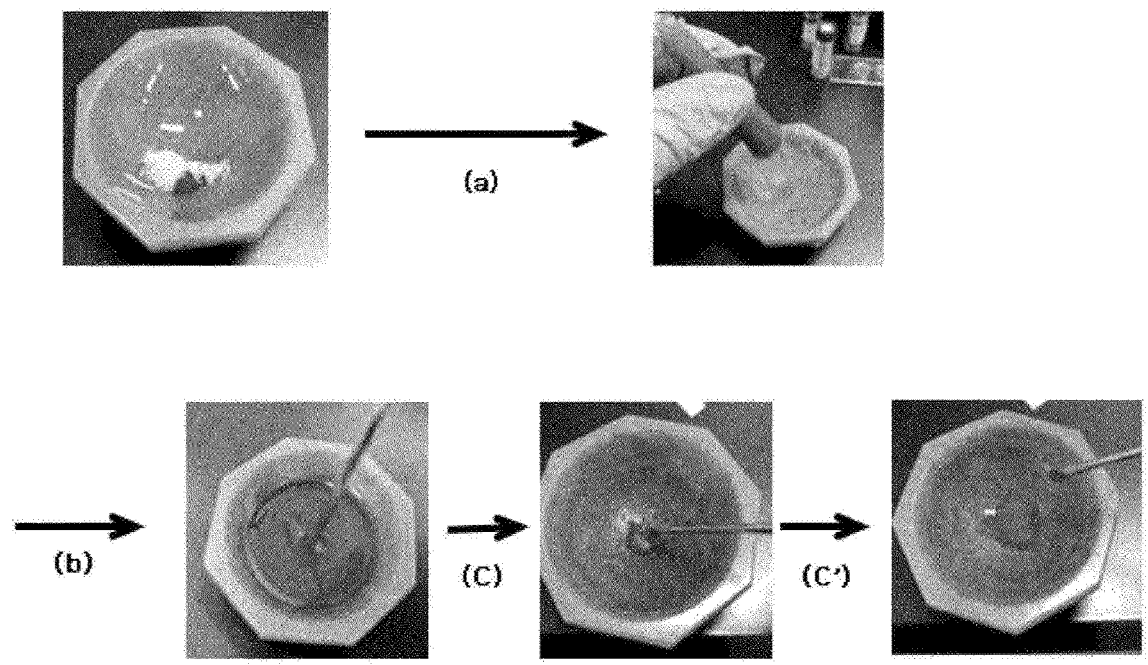
[Fig. 2]
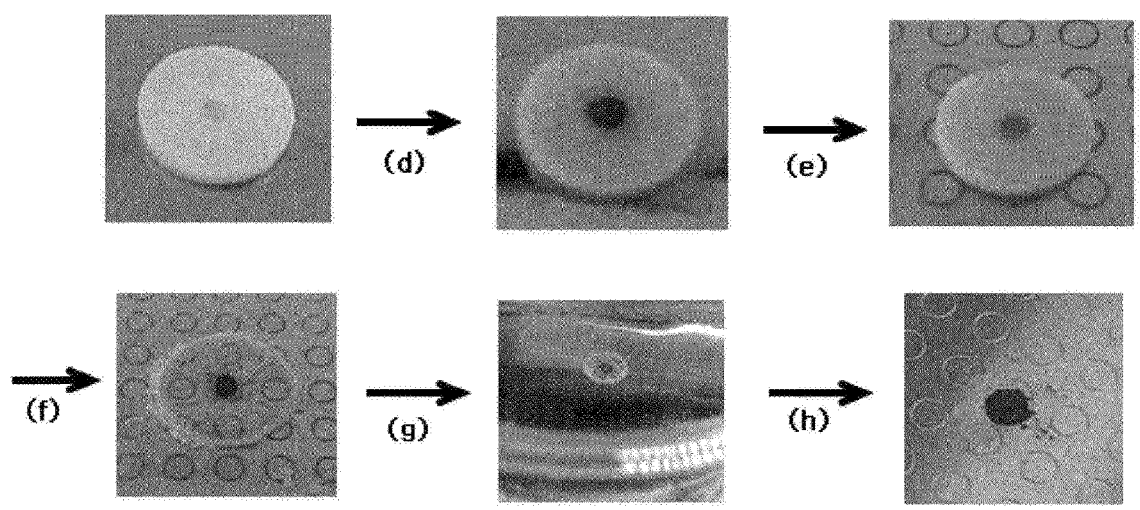

[Fig. 3]
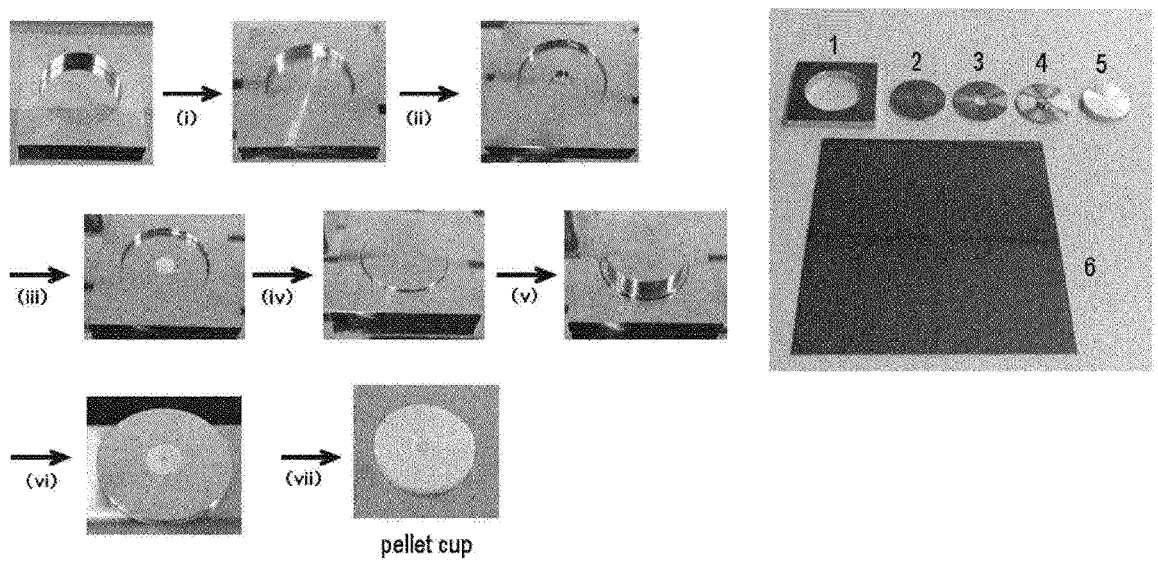
[Fig. 4]
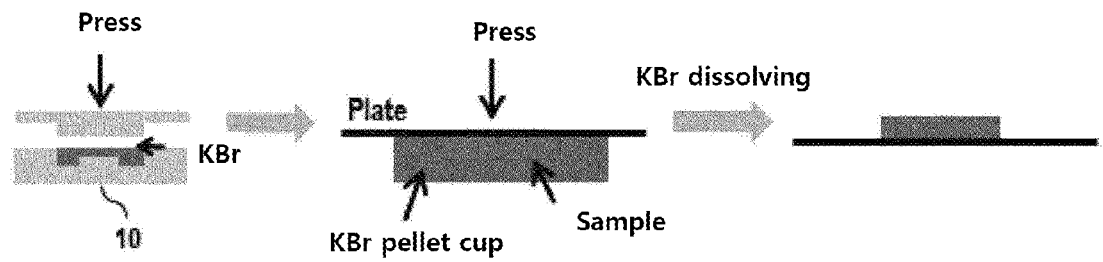
[Fig. 5]
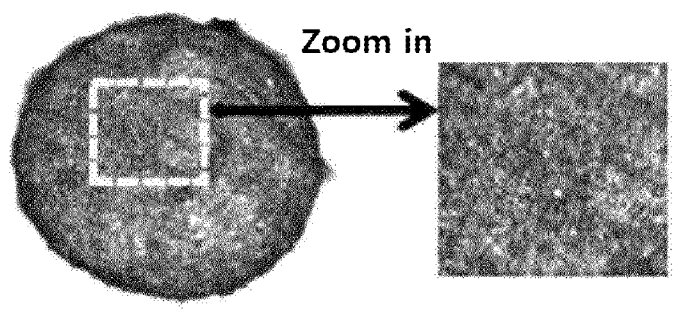

[Fig. 6]
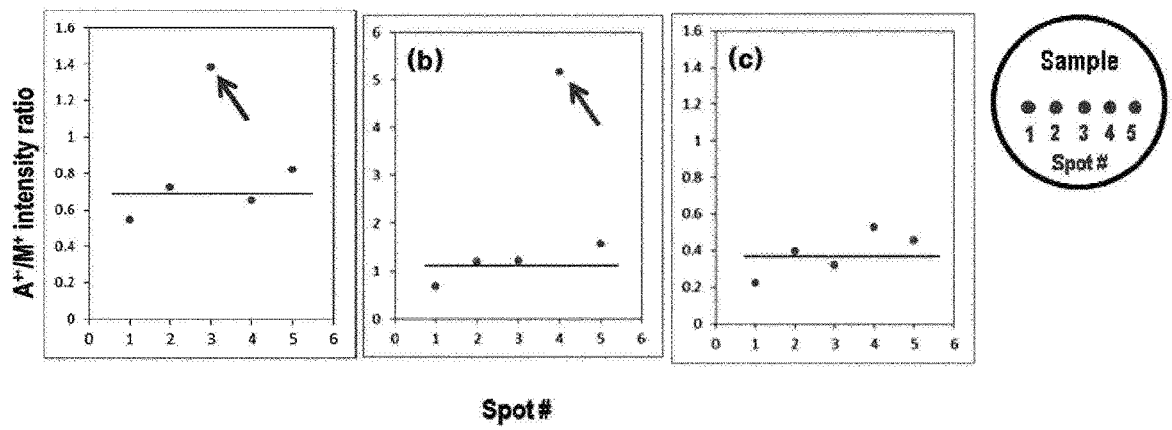
[Fig. 7]
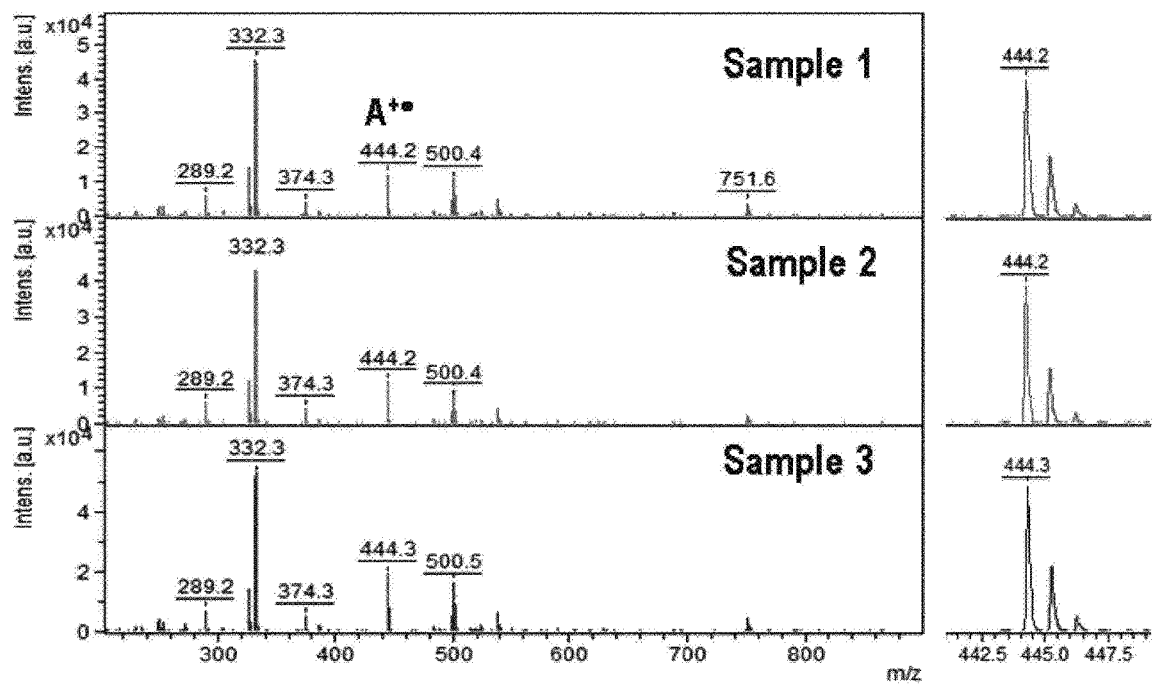

[Fig. 8]
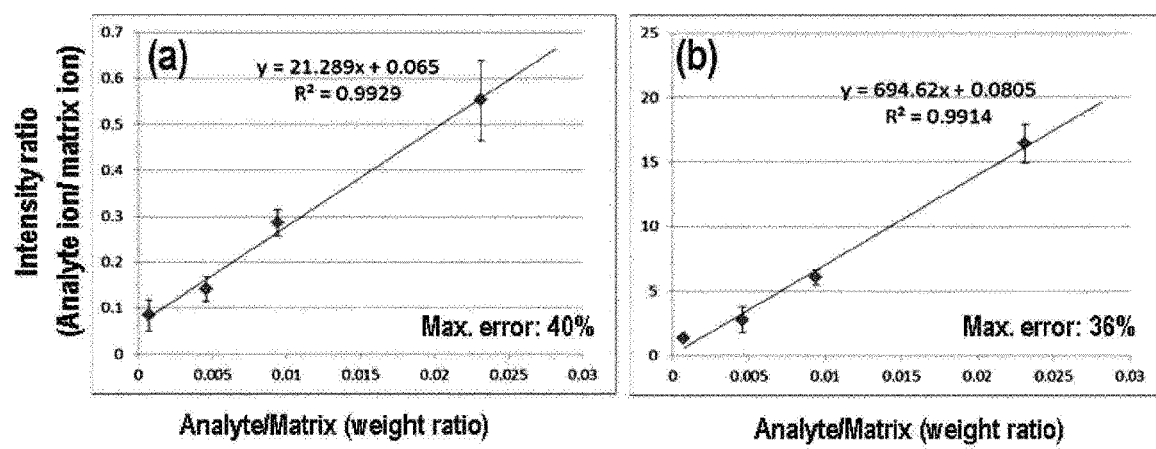

METHOD FOR PRODUCING TEST PIECES OF WATER-INSOLUBLE MATERIAL FOR MALDI MASS SPECTROMETRY AND METHOD FOR QUANTITATIVE ANALYSIS OF WATER-INSOLUBLE MATERIAL USING MALDI MASS SPECTROMETRY

CROSS-REFERENCE TO RELATED APPLICATIONS

The present application is a national phase entry under 35 U.S.C. § 371 of International Application No.PCT/KR2019/011775 filed on Sep. 11, 2019, which claims priority to Korean Patent Application No. 10-2018-0108097, filed on Sep. 11, 2018 and Korean Patent Application No. 10-2019-0112140, filed on Sep. 10, 2019, the entire disclosures of which are incorporated by reference herein.

BACKGROUND OF THE INVENTION

1. Field of the Invention

The present invention relates to a method of manufacturing a specimen of water insoluble material or MALDI mass spectrometry and a method for a quantitative analysis of the specimen, and more particularly, to a method of manufacturing a homogeneous specimen of water insoluble material having small thickness deviation for MALDI mass spectrometry and a method for obtaining a reproducible MALDI spectrum using the specimen with commercial MALDI-TOF MS equipment.

2. Description of the Related Art

In order to obtain quantitative information by mass spectrometry, it is necessary to obtain a reproducible spectrum for the same sample and to prepare a linear calibration curve according to the concentration of the sample.

MALDI-TOF mass spectrometry (Matrix-Assisted Laser Desorption Ionization-Time of Flight Mass Spectrometry, hereinafter referred to simply as "MALDI") is a mass spectrometry capable of analyzing insoluble materials. However, MALDI is known to be difficult to use for accurate quantitative analysis because crystals obtained by mixing a sample and a matrix are inhomogeneous and ion signals are unstable due to shot to shot variation of laser, causing poor spectrum reproducibility. Recently, reproducibility of MALDI spectra has been reported for peptides and biomolecules. However, the quantification method of synthetic polymers has not been standardized, and it is difficult to obtain consistently effective results using the commercial MALDI-TOF MS equipment.

The present inventors have produced their own polymer specimens with uniform thickness by electrospray of a soluble polymeric sample through a mask with holes in order to increase the reproducibility of the MALDI spectrum (KR Patent Application No. 10-2017-0130010, filed on Oct. 11, 2017, by LG Chem Co., Ltd.). In addition, the present inventors have found that the thickness of the specimen affects the reproducibility of the spectrum, and developed a technique of preparing a linear calibration curve using an internal standard from the reproducible MALDI spectrum obtained using a polymer sample having a small thickness variation for each concentration (KR Patent application 10-2017-0157161, filed on Nov. 23, 2017, by LG Chem Co., Ltd.). All contents disclosed in the above patent documents are incorporated herein by reference. However, these methods were not applicable for insoluble (or poorly soluble) materials.

In the prior arts, attempts have been made to ensure homogeneity of samples using pestles, mortars, ball mills, etc. in order to ensure reproducibility of the MALDI spectrum for insoluble materials. However, it is difficult to handle the sample due to large variation in homogeneity depending on the skill and due to static electricity. In addition, there is a method of manufacturing a specimen in a pellet form by mixing a matrix and an insoluble material and then pressing it, which is difficult to control the thickness of the specimen.

In addition, the CS technique (compressed-sample technique) is known as a method for preparing a specimen of insoluble material. CS technique is a method of making a specimen by drilling a hole in the plate on which the specimen is placed, inserting a sample into the hole and pressing the sample with blocking one side of the hole. However, according to the CS technique, the electric field is not uniformly formed in the specimen due to the hole of the plate, resulting in different peak m/z in the spectrum obtained at the center and the edge of the hole.

Thereafter, in order to overcome the disadvantages, attempts have been made to minimize the distortion of the electric field by reducing the size of the pore and adding conductive materials (e.g., iron powder) to the sample to overcome the disadvantages. However, this method is expected to deteriorate reproducibility in the manufacture of specimen because the smaller the size of the hole, the more difficult it is to insert the sample into the hole. And it is not always ensured homogeneity from mixing the sample with the conductive material. There has not been developed a method for obtaining specimens that provide reproducible MALDI spectra for insoluble materials.

In order to ensure reproducibility of the MALDI spectrum for insoluble materials using commercial MALDI-TOF MS equipment, the problems of homogeneous mixing of an insoluble material and a matrix and production of specimens with small thickness variations should be solved.

SUMMARY OF THE INVENTION

The problem to be solved by the present invention is to provide a method for manufacturing a specimen of uniform thickness in which a sample of water insoluble material is homogeneously distributed in order to obtain a reproducible MALDI spectrum of the water insoluble material.

Another problem to be solved by the present invention is to obtain a reproducible MALDI spectrum for a specimen of water insoluble material having a uniform thickness and to quantitatively analyze the water insoluble material therefrom.

In order to solve the problem, the present invention provides a method of manufacturing specimens of water insoluble materials for MALDI mass spectrometry, comprising the steps of:

(S1) mixing a water insoluble material and a matrix, and then adding a volatile solvent to disperse the water insoluble material and the matrix until the volatile solvent is evaporated, thereby obtaining a sample of water insoluble material; and (S2) filling a groove of a pellet cup made of a water soluble material with the sample, turning the pellet cup filled with the sample upside down and pressing it, and then dissolving the pellet cup with water to obtain a specimen of water insoluble material.

Furthermore, the present invention provides a quantitative analysis method of water insoluble materials with the specimen of water insoluble material prepared by the above-described method, comprising the steps of:

obtaining a MALDI mass spectrum for the specimen of water insoluble material; and calculating a signal intensity ratio of water insoluble material to matrix from peak results of the spectrum and plotting it according to a weight ratio of water insoluble material to matrix, thereby preparing a quantitative calibration line.

Effect of the Invention

In the present invention, a reproducible MALDI spectrum can be obtained by manufacturing a specimen of water insoluble material with homogeneity and small thickness variations, thereby enabling quantitative analysis of the water insoluble material using commercial MALDI-TOF MS equipment.

BRIEF DESCRIPTION OF THE DRAWINGS

FIG. 1 illustrates a procedure of obtaining a homogeneous sample of water insoluble material in the method of manufacturing specimens for MALDI mass spectrometry according to an embodiment of the present invention.

FIG. 2 illustrates a procedure of obtaining a specimen from the sample of water insoluble material in the method of manufacturing specimens for MALDI mass spectrometry according to an embodiment of the present invention.

FIG. 3 illustrates a procedure of manufacturing a KBr pellet cup used in the method of manufacturing specimens for MALDI mass spectrometry according to an embodiment of the present invention.

FIG. 4 shows a procedure of manufacturing the specimen including the manufacture of the pellet cup.

FIG. 5 is a micrograph of a specimen of water insoluble material obtained by the method of manufacturing specimens for MALDI mass spectrometry according to an embodiment of the present invention.

FIG. 6 is a result of reproducibility evaluation of spot-to-spot MALDI mass spectra of specimens of water insoluble material manufactured according to Examples and Comparative Examples of the present invention.

FIG. 7 is a MALDI mass spectrum obtained for each of three specimens of water insoluble material manufactured under the same conditions in accordance with an embodiment of the invention.

FIG. 8 shows a linear quantitative calibration line prepared by plotting a signal intensity ratio of analyte (water insoluble material) to matrix according to a weight ratio of analyte to matrix, from the results of the MALDI mass spectrum obtained for the specimen of water insoluble material manufactured according to the embodiment of the present invention.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

As used herein, the term "water insoluble" is meant to encompass both insoluble and difficult to dissolve in water.

As used herein, the term "homogeneity" or "homogenous" refers to a state in which components contained in a sample or specimen in a proportion are uniformly distributed with each other.

Hereinafter, the present invention will be described in detail.

One embodiment of the present invention is directed to a method of preparing a specimen of uniform thickness in which sample of water insoluble material is homogeneously distributed in order to obtain a reproducible MALDI spectrum of the water insoluble material, wherein the method comprises the steps of (S1) obtaining a sample of water insoluble material; and (S2) obtaining a specimen from the sample by using a pellet cup.

In the step (S1), the water insoluble material and the matrix are mixed, and then a volatile solvent is added to disperse the water insoluble material and the matrix until the volatile solvent is evaporated to obtain a sample of water insoluble material.

FIG. 1 illustrates in detail a procedure of obtaining a homogeneous sample of water insoluble material in the method for manufacturing a specimen for MALDI mass spectrometry according to an embodiment of the present invention.

Referring to FIG. 1, in the present invention, a water insoluble material to be analyzed and a matrix are mixed by a mortar and pestle (a), a volatile solvent is added to the mixture to dissolve the matrix, and the water insoluble material is dispersed in the resulting solution (b), and then the dispersion is stirred with a spatula until all the volatile solvents used are evaporated (c and c'). Accordingly, a sample of water insoluble material can be obtained.

That is, the present invention is characterized by performing, in addition to the step (a) of mixing the analyte (water insoluble material) and the matrix using a mortar and pestle to increase homogeneity of the sample in the prior art, the step (b) of dissolving the matrix in a volatile solvent and dispersing the water insoluble material in the solution and the step (c, c') of homogeneously mixing the matrix and the water insoluble material via solvent evaporation while maintaining the dispersed state. According to the procedure of obtaining the sample of the present invention, the homogeneity of the sample is improved and the static electricity is not generated in the sample, thereby improving handling property of the sample.

The degree of uniform distribution of each component in the sample obtained according to the present invention can be evaluated from the error range of the MALDI spectral results of the specimen prepared therefrom. It can be evaluated that the smaller the error range, the more the uniform distribution, that is, the homogeneity of the sample.

In one embodiment, the water insoluble material includes an anthraquinone pigment such as Pigment Red 177 (PR177, 4,4'-diamino[1,1'-bianthracen]-9,9',10,10'-tetraone), a copper phthalocyanine pigment, a perylene pigment, a diketopyrrolopyrrole pigment, a benzimidazolone pigment, an isoindoline pigment, or a dioxazine pigment, but is not limited thereto.

In one embodiment, the matrix to be mixed with the water insoluble material has a low solubility in water, and may be DCTB (trans-2-[3-(4-tert-butylphenyl)-2-methyl-2-propenylidene]malononitrile), DPF (α,β-diphenylfumaronitrile), α-cyano-4-hydroxycinnamic acid or dithranol (1,8,9-trihydroxyanthracene), but is not limited thereto.

The contents of the water insoluble material and the matrix are not particularly limited, but they may be mixed in a weight ratio of 1:20 to 1:100, such as 1:20.

In one embodiment, the volatile solvent to be added to the water insoluble material and the matrix may be one or more selected from tetrahydrofuran (THF), chloroform and the like, but is not limited thereto.

In one embodiment, in addition to the mortar and pestle, a ball mill may be used in mixing the matrix with the water insoluble material.

Next, in the step (S2), the sample obtained above is filled into a groove of a pellet cup made of a water soluble material and the pellet cup is turned upside down and pressed, and then the pellet cup is melted with water to obtain a specimen of water insoluble material.

FIG. 2 illustrates in detail a procedure of obtaining a specimen from a sample of water insoluble material in the method for manufacturing specimens for MALDI mass spectrometry according to an embodiment of the present invention.

Referring to FIG. 2, in the present invention, a pellet cup made of a water soluble material is prepared and filled with a sample of water insoluble material in its groove (d), the pellet cup filled with the sample is turned upside down (e), the press is performed (f), the used pellet cup is dissolved in water (g) and additional drying is performed (h), thereby obtaining a water insoluble specimen. In this case, the press may be performed for 10 to 20 seconds at a pressure of 1 to 5 bars by using a hot press.

In the present invention, in order to press the homogeneous sample of water insoluble material obtained according to the above procedure on a predetermined area and at the same pressure between the samples, a pellet cup is used as a means of confining the same amount of the sample to a certain area. The pellet cup may be used without limitation as long as it is a water soluble material that can be dissolved in water. For example, a pellet cup made of KBr, NaBr, $MgBr_2$, NaCl, or a mixture thereof may be used.

FIG. 3 illustrates a procedure of manufacturing a KBr pellet cup used in the method of manufacturing specimens for MALDI mass spectrometry according to an embodiment of the present invention.

Referring to FIG. 3, a unit for manufacturing a KBr pellet cup may include a flat square plate 6, a square frame 1 with a centered circular hole, which is placed on the plate 6, circular members 2, 3, and 4, which are placed in the circular hole of the square frame 1 in this order, and a circular member 5 which is placed on the circular member 4 and then pressed.

The specific procedure of manufacturing a KBr pellet cup is as follows.

First, the frame 1 with a circular hole in the center is placed on the plate 6, and the circular member 2 is put in the circular hole of the frame 1 (step i). The plate 6 is used during the entire process from the production of the KBr pellet cup to the production of the specimen. The shape, the dimension and the material of the plate 6 are not particularly limited as long as the entire process of production of the specimen can be easily performed. Subsequently, the circular member 3 is placed on the circular member 2 (step ii). At this time, the circular member 2 has a convex portion at the center, and the circular member 3 has a shape with a small circular hole in the center. Subsequently, KBr is filled in the center hole of the circular member 3 (step iii). The convex portion and its size of the circular member 2 and the hole and its size of the center of the circular member 3 correspond to the shape and dimension of the KBr pellet cup to be described later. As KBr is filled in the center hole of the circular member 3, the circular member 4 is placed thereon (step iv). The circular member 4 has a convex portion at the center. Thereafter, the circular member 5 is placed on the circular member 4 (step v), and then pressing is performed (step vi). At this time, the same pressure is applied over the entire area of the circular member 5. Since the circular members 2, 3 and 4 are put in the circular hole of the frame 1 in this order, they must be sized to exactly fit the circular hole of the frame 1. After pressing the circular member 5 sufficiently, the circular members 5 and 4 are removed and the circular member 2 and the frame 1 are removed, leaving only the circular member 3 on the plate 6. KBr is firmly filled in the center hole of the circular member 3 by pressing. Finally, the circular member 3 is removed to complete the KBr pellet cup (step vii). The completed pellet cup is shaped to be grooved at the center by the convex portion of the circular member 2.

In the present invention, the shape and the dimension of the frame 1 are not particularly limited, but it is preferable that all of the circular members 2, 3, and 4 are inserted into the circular holes of the frame 1, so that the thickness of the frame may be equal to or greater than the sum of the thicknesses of the circular members 2, 3 and 4. The circular member 5 should be smaller than the circular member 4 in order to facilitate pressing. The material of the circular members 1 to 5 is not particularly limited, and for example, stainless steel, aluminum, or the like.

In one embodiment, the press may be performed using a hot press. For example, the press may be performed at a pressure of 1 to 5 bars for 10 to 20 seconds.

The sizes of the circular hole of the frame 1 and the hole at the center of the circular member 3 are not particularly limited.

In one embodiment, the pellet cup may have a circular or polygonal form.

FIG. 4 schematically shows a procedure of manufacturing the specimen including the manufacture of the pellet cup, the procedure comprising placing a material of the pellet cup such as KBr into a unit for manufacturing the pellet cup, pressing it to produce the pellet cup (see FIG. 3), charging a sample of water insoluble material into the resulting pellet cup, turning the pellet cup upside down and mounting it on a MALDI sample plate and pressing it, and then dissolving the pellet cup.

As such, with the pellet cup, it is not necessary to drill a hole in the plate on which the specimen is placed, as in the case of the preparation of specimen by the conventional CS technique (compressed sample technique) and it can be overcome the disadvantage caused by the nonuniformity of the electric field due to use of CS technology. In other words, the pellet cup applied in the present invention can be pressed at the same pressure per unit volume with the sample being confined therein, thus making it possible to produce a uniform specimen. In addition, it is possible to prevent the specimen surface from damage due to the press, by dissolving in water only the pellet cup, not the sample pressed together with the pellet cup.

The specimen of water insoluble material of the present invention as manufactured above may have a thickness of 20 µm or less, such as 10 µm or less. In addition, the thickness variation may be 30% or less when the thickness of the specimen is measured at a plurality of spots, for example, three or more spots, to calculate the standard deviation of the average value.

As such, when a specimen of water insoluble material having small thickness variation is used for MALDI mass spectrometry, a reproducible MALDI spectrum can be obtained, thereby enabling quantitative analysis of a sample of water insoluble material.

Accordingly, the present invention provides a method for quantitative analysis of water insoluble materials using MALDI mass spectrometry of a specimen of water insoluble material prepared using a pellet cup.

Specifically, the analysis method comprises the steps of obtaining a MALDI mass spectrum for a specimen of water insoluble material prepared using a pellet cup; and calculating a signal intensity ratio of water insoluble material to matrix from the peak results of the spectrum, and plotting it as a weight ratio of water insoluble material to matrix, thereby preparing a quantitative calibration line.

The MALDI mass spectrum can be obtained using commercial MALDI-TOF MS equipment. At this time, in order to obtain a spectrum having a good S/N ratio (signal-to-noise ratio), the MALDI spectrum may be obtained at several spots, for example, at three or more spots, or five or more spots in 50 to 200 shots per spot for the specimen to determine an average value.

In one embodiment, the MALDI mass spectrum of the specimen of water insoluble material has 40% or less, specifically 35% or less, such as 25 to 35% or 25 to 30% of a relative standard deviation (RSD) which indicates the error of the result when measured for three or more spots on the same specimen (spot-to-spot). In addition, the RSD of results of the MALDI mass spectrum measured on three or more specimens manufactured under the same conditions (sample-to-sample) is 40% or less, specifically 30% or less, such as 20 to 30% or 25 to 30%. Such RSD range demonstrates the reproducibility of the MALDI spectrum obtained from the specimen manufactured according to the present invention to ensure thickness uniformity.

In addition, the quantitative calibration line prepared using the results of reproducible MALDI spectrum, i.e., the quantitative calibration line prepared by plotting a signal intensity ratio of water insoluble material to matrix according to a weight ratio of water insoluble material to matrix, are all linear (see FIG. 8). From this, quantitative analysis of the water insoluble material is possible.

Hereinafter, embodiments of the present invention will be described in detail so that those skilled in the art can easily carry out the present invention. The present invention may, however, be embodied in many different forms and should not be construed as limited to the embodiments set forth herein.

Example 1

Step 1: Preparation of Sample
Pigment Red 177 (PR177, $C_{28}H_{16}N_2O_4$, Exact Mass 444.11) represented by the following formula as a water insoluble material to be analyzed and DCTB (trans-2-[3-(4-tert-butylphenyl)-2-methyl-2-propylidene]malononitrile) as a matrix were used. As shown in FIG. 2, the water insoluble material and the matrix were mixed in a mortar & pestle with a weight ratio of 1:20 and ground with a mortar. THF (2 mL) was added thereto as a volatile solvent for dispersing the mixture and mixed continuously. Subsequently, it was continuously mixed while stirring with a spatula until THF was evaporated to obtain a sample having the water insoluble material and the matrix uniformly distributed.

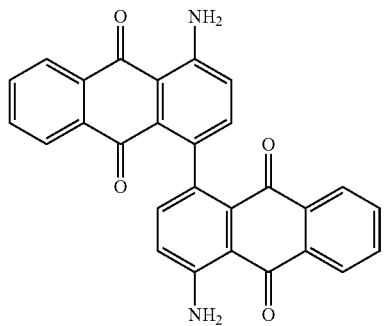

<Pigment Red 177>

Step 2: Preparation of Specimen
The sample prepared in the step 1 was filled into the groove of the KBr pellet cup prepared as shown in FIG. 4. The KBr pellet cup filled with the sample was turned upside down and mounted on the MALDI sample plate, and then the pressure of 5 bars was applied to the KBr pellet cup for 20 seconds. Subsequently, KBr was dissolved in water to prepare a PR177 specimen having a thickness of about 10 μm.

FIG. 5 shows a micrograph of the prepared specimen, from which it can be seen that there is no surface damage of the sample.

Comparative Example 1

Step 1: Preparation of Sample
A sample was prepared by only mixing PR 177 as a water insoluble material and DCTB as a matrix in a mortar & pestle in a weight ratio of 1:20 and grinding it with a mortar.

Step 2: Preparation of Specimen
A specimen was prepared in the same manner as in the step 2 of Example 1.

Comparative Example 2

Step 1: Preparation of Sample
A sample was prepared in the same manner as in the step 1 of Example Step 2: Preparation of Specimen
A specimen was prepared by placing the sample obtained in the step 1 on a MALDI sample plate without the use of a KBr pellet cup and then simply pressing it.

Experimental Example 1: Spot-to-Spot Reproducibility Evaluation

Using a MALDI-TOF mass spectrometer (UltrafleXtreme, Bruker Daltonics, Germany), MALDI mass spectra were obtained for five spots of each of PR177 specimens prepared according to the Examples and Comparative Examples. From the spectral results, a ratio of intensity ($A^+/M^+$ intensity ratio) of the base peak of PR177 ion ($A^+$) and the base peak of ion ($M^+$) having the largest intensity among DCTB-derived ions for each spot was calculated. The intensity ratio for each of five spots of the PR177 specimen prepared according to Comparative Example 1 is shown in FIG. 6(*a*), the intensity ratio for each of five spots of the PR177 specimen prepared according to Comparative Example 2 is shown in FIG. 6(b), and the intensity ratio for each of the five spots of the PR177 specimen prepared according to Example 1 is shown in FIG. 6(c).

From the FIGS. 6(a) and (b), it can be seen that the intensity ratio ($A^+/M^+$ intensity ratio) for each spot of the specimens prepared in Comparative Examples 1 and 2 deviates significantly from the average (see a green arrow). In particular, in the case of Comparative Example 2 in which the specimen was prepared without a pellet cup after preparing the sample in the same manner, the signal was not detected at all when changing the position of the specimen even under the condition that the signal appeared well at a specific position. It is considered to be caused by a large variation in the positional relationship between the laser and the specimen due to the severe variation in the thickness of the specimen.

On the other hand, in the results for the specimen prepared by the method according to Example 1 as shown in FIG. 6(c), it can be seen that the intensity ratio ($A^+/M^+$ intensity ratio) for each spot deviates slightly from the average (in Example 1, the RSD between the intensity ratios is 30% or less).

As described above, according to the present invention, in the case that the specimen is manufactured using the pellet cup from the sample which is prepared by using a volatile solvent when mixing the water insoluble material and the matrix to improve dispersibility of the mixture, the homogeneity of the specimen is improved, compared to Comparative Example 1 in which only a simple mixing was carried out using a mortar and pestle to obtain a sample, and Comparative Example 2 in which the pellet cup was not used in the preparation of the specimen and high spot-to-spot reproducibility of the MALDI mass spectrum is achieved.

Experimental Example 2: Sample-to-Sample Reproducibility Evaluation

Three specimens were prepared under the same conditions according to the Examples. The MALDI mass spectra obtained for each specimen are shown in FIGS. 7 (a), (b) and (c).

From FIG. 7, the reproducibility of the intensity pattern and peak position of the peaks in three specimens can be confirmed. In addition, the intensity ratio ($A^+/M^+$ intensity ratio) of base peak of PR177 ion ($A^+$) to base peak of ion ($M^+$) having the largest intensity among DCTB-derived ions was 25%. Therefore, the MALDI mass spectra of the specimens prepared according to the present invention also have high sample-to-sample reproducibility.

Experimental Example 3: Evaluation of Quantitative Calibration Curve

Signal intensity ratios of analyte (water insoluble material) to matrix were calculated using the mass spectral peaks of FIG. 7, and the ratios were plotted according to a weight ratio of analyte to matrix to prepare a quantitative calibration curve. The results are shown in FIG. 8.

Specifically, FIG. 8 shows a linear quantitative calibration line created using matrix peaks corresponding to m/z 332(a) and m/z 250(b) ($R^2$=0.99 or more).

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

What is claimed is:

1. A method of manufacturing specimens of water insoluble materials for MALDI mass spectrometry, comprising:
    (S1) mixing a water insoluble material and a matrix, and then adding a volatile solvent to disperse the water insoluble material and the matrix in a resulting solution; and stirring the resulting solution until the volatile solvent is evaporated, thereby obtaining a sample of water insoluble material; and
    (S2) filling a groove of a pellet cup made of a water soluble material with the sample, turning the pellet cup filled with the sample upside down and pressing it, and then dissolving the pellet cup with water to obtain a specimen of water insoluble material.

2. The method of manufacturing specimens of water insoluble materials for MALDI mass spectrometry according to claim 1, wherein the water insoluble material comprises an anthraquinone pigment, a copper phthalocyanine pigment, a perylene pigment, a diketopyrrolopyrrole pigment, a benzimidazolone pigment, an isoindoline pigment, a dioxazine pigment or a mixture thereof.

3. The method of manufacturing specimens of water insoluble materials for MALDI mass spectrometry according to claim 2, wherein the water insoluble anthraquinone pigment is Pigment Red 177 (PR177, 4,4'-diamino[1,1'-bianthracen]-9,9',10,10'-tetraone).

4. The method of manufacturing specimens of water insoluble materials for MALDI mass spectrometry according to claim 1, wherein the matrix to be mixed with the water insoluble material comprises DCTB (trans-2-[3-(4-tert-butylphenyl)-2-methyl-2-propenylidene]malononitrile), DPF (α,β-diphenylfumaronitrile), α-cyano-4-hydroxycinnamic acid, dithranol (1,8,9-trihydroxyanthracene), or mixtures thereof.

5. The method of manufacturing specimens of water insoluble materials for MALDI mass spectrometry according to claim 1, wherein the volatile solvent to be added to the water insoluble material and the matrix comprises tetrahydrofuran (THF), chloroform or mixtures thereof.

6. The method of manufacturing specimens of water insoluble materials for MALDI mass spectrometry according to claim 1, wherein the pellet cup defines a homogeneous sample containing a uniform amount of water insoluble material per unit volume.

7. The method of manufacturing specimens of water insoluble materials for MALDI mass spectrometry according to claim 1, wherein the pellet cup is composed of KBr, NaBr, $MgBr_2$, NaCl or mixtures thereof.

8. A quantitative analysis method of water insoluble materials with the specimen of water insoluble material manufactured by the method according to claim 1, comprising the steps of:
    obtaining a MALDI mass spectrum for the specimen of water insoluble material; and
    calculating a signal intensity ratio of water insoluble material to matrix from peak results of the spectrum and plotting the signal intensity ratio according to a weight ratio of water insoluble material to matrix, thereby preparing a quantitative calibration line.

9. A quantitative analysis method of water insoluble materials according to claim 8, wherein a relative standard deviation (RSD) of the MALDI mass spectrum as measured at different spots of the specimen is 40% or less.

10. A quantitative analysis method of water insoluble materials according to claim 8, wherein a relative standard deviation (RSD) of the MALDI-TOF mass spectrum as measured by applying a plurality of the specimens of water insoluble material manufactured under the same conditions is 40% or less.

* * * * *